US012500327B2

United States Patent
Jian et al.

(10) Patent No.: US 12,500,327 B2
(45) Date of Patent: Dec. 16, 2025

(54) SYSTEMS AND METHODS FOR A MOBILE ACCESS POINT WIRELESS NETWORK SYSTEM

(71) Applicant: Georgia Tech Research Corporation, Atlanta, GA (US)

(72) Inventors: Yubing Jian, Atlanta, GA (US); Raghupathy Sivakumar, Atlanta, GA (US); Shyam Krishnan Venkateswaran, Atlanta, GA (US); Ching-Lun Tai, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 498 days.

(21) Appl. No.: 17/923,761

(22) PCT Filed: May 11, 2021

(86) PCT No.: PCT/US2021/031783
§ 371 (c)(1),
(2) Date: Nov. 7, 2022

(87) PCT Pub. No.: WO2021/231429
PCT Pub. Date: Nov. 18, 2021

(65) Prior Publication Data
US 2023/0187808 A1    Jun. 15, 2023

Related U.S. Application Data

(60) Provisional application No. 63/022,656, filed on May 11, 2020.

(51) Int. Cl.
*H04W 4/00* (2018.01)
*H01Q 1/00* (2006.01)
(Continued)

(52) U.S. Cl.
CPC ........... *H01Q 1/1257* (2013.01); *H01Q 1/007* (2013.01); *H04W 16/20* (2013.01); *H04W 64/00* (2013.01); *H04W 88/08* (2013.01)

(58) Field of Classification Search
CPC ..... H01Q 1/1257; H01Q 1/007; H04W 16/20; H04W 64/00; H04W 88/08; H04W 4/025;
(Continued)

(56) References Cited

U.S. PATENT DOCUMENTS

| 8,738,024 B1 * | 5/2014 | Kerr | H04W 4/021 370/310 |
| 9,037,131 B2 * | 5/2015 | Park | H04W 16/20 455/456.2 |

(Continued)

OTHER PUBLICATIONS

International Search Report and Written Opinion from Application No. PCT/US2021/231429 dated Aug. 10, 2021.

*Primary Examiner* — Phuongchau Ba Nguyen
(74) *Attorney, Agent, or Firm* — TROUTMAN PEPPER LOCKE LLP; Ryan A. Schneider; Stephanie J. Remy

(57) ABSTRACT

An exemplary embodiment of the present disclosure provides a wireless network system comprising a mobile access point, a wireless device, and an actuator. The actuator further configured to move the mobile access point to a position having an improved line of sight condition between the wireless device and the mobile access point.

14 Claims, 7 Drawing Sheets

(51) Int. Cl.
*H01Q 1/12* (2006.01)
*H04W 16/20* (2009.01)
*H04W 64/00* (2009.01)
*H04W 88/08* (2009.01)

(58) Field of Classification Search
CPC ..... H04W 80/04; H04W 88/06; H04W 84/18; H04L 29/06
See application file for complete search history.

(56) References Cited

U.S. PATENT DOCUMENTS

| | | |
|---|---|---|
| 9,363,690 B1 * | 6/2016 | Singh .................... G05D 1/0011 |
| 2003/0035437 A1 | 2/2003 | Garahi et al. |
| 2004/0004948 A1 | 1/2004 | Fletcher et al. |
| 2006/0002326 A1 * | 1/2006 | Vesuna ................. H04W 16/18 370/328 |
| 2014/0376529 A1 | 12/2014 | Ramachandran et al. |
| 2016/0373963 A1 * | 12/2016 | Chechani .............. H04W 24/04 |
| 2017/0171834 A1 | 6/2017 | Neves et al. |
| 2018/0007518 A1 * | 1/2018 | O'Berry ............. H04B 7/18506 |
| 2021/0112373 A1 * | 4/2021 | Pazhyannur .......... H04W 76/10 |
| 2022/0385414 A1 * | 12/2022 | Thubert ................ H04W 80/02 |

* cited by examiner

116: Non-Line-of-Sight Condition
118: Line-of-Sight Condition

Simulation Results
508

502: Single Static AP
504: Brute-Force
506: WiMove

Experimental Results
510

Simulation Results
508

502: Single Static AP
504: Brute-Force
506: WiMove

Experimental Results
510

Simulation Results
508

502: Single Static AP
504: Brute-Force
506: WiMove

Experimental Results
510

SYSTEMS AND METHODS FOR A MOBILE ACCESS POINT WIRELESS NETWORK SYSTEM

CROSS-REFERENCE TO RELATED APPLICATIONS

This application claims benefit under 35 USC § 119(e) of U.S. Provisional Patent Application No. 63/022,656 filed 11 May 2020, the entirety of which is incorporated herein by reference as if set forth herein in its entirety.

FIELD OF THE DISCLOSURE

The present disclosure relates generally to a wireless network system and more particularly to a mobile access point wireless network system.

BACKGROUND

High throughput wireless networks are desirable. One promising option, mmWave communication wireless networks, can provide higher bandwidth when compared to typical 2.4 GHz and 5 GHz wireless networks, but these systems can also experience poor penetration and shorter wave travel distance owing to the higher propagation loss. This can lead to poor connectivity between access points and wireless devices, especially when there are obstacles blocking the line of sight between the access point and wireless device(s). To solve this problem, mmWave wireless network systems typically utilize multiple access points to provide connectivity to wireless devices within a space. But utilizing multiple access points in a wireless network system is inefficient and adds cost to a system. Therefore, what is a needed is a wireless network system that can utilize high frequency bands, including the mmWave band, to provide high throughput while also providing high levels of connectivity, even in spaces where obstacles may block line of sight between access points and wireless devices.

SUMMARY

The present disclosure relates to a wireless network system. An exemplary embodiment of the present disclosure provides a wireless network system. The wireless network system can comprise a mobile access point, a wireless device, and an actuator. The actuator can be configured to move the mobile access point to a position having an improved line of sight condition between the wireless device and the mobile access point.

In any of the embodiments disclosed herein, the mobile access point can be disposed on a ceiling within a space.

In any of the embodiments disclosed herein, the actuator can be a linear actuator.

In any of the embodiments disclosed herein, the wireless network system can comprise a track. The track can be configured to support the mobile access point.

In any of the embodiments disclosed herein, the wireless network system can comprise a controller. The controller can be configured to output one or more control signals to the actuator to move the mobile access point.

In any of the embodiments disclosed herein, the controller can be configured to receive a request to connect to the mobile access point from the wireless device. The controller can be configured to receive location data from the wireless device corresponding to a location of the wireless device. The controller can be configured to determine an optimal location of the mobile access point. The optimal location of the mobile access point can be a location of the mobile access point with line of sight conditions between the mobile access point and the wireless device. The controller can be configured to output a first control signal to the actuator to move the mobile access point to the optimal location.

In any of the embodiments disclosed herein, the controller can be configured to receive a request to connect to the mobile access point from the wireless device. The controller can be configured to receive location data from the wireless device corresponding to a location of the wireless device. The controller can be configured to receive connectivity data between the wireless device and the mobile access point when the mobile access point is located at a first location. The controller can be configured to determine if there is an obstacle in the line of sight between the wireless device and the mobile access point at the first location. The line of sight determination can be based at least in part on the connectivity data between the wireless device and the mobile access point. The controller can be configured to output a first control signal to the actuator to move the mobile access point to a second location. The controller can be configured to determine if there is an obstacle in the line of sight between the wireless device and the mobile access point at the second location based. The line or sight determination can be based at least in part on the connectivity data between the wireless device and the mobile access point. The controller can be configured to repeat outputting the one or more control signals to the actuator to move the mobile access point and determining if there is an obstacle in the line of sight between the wireless device and the mobile access point.

In any of the embodiments disclosed herein, the controller can be configured to create, through machine learning, a map of one or more obstacles within a space. The map of obstacles within a space can be based at least in part on a plurality of line of sight determinations made by the controller.

In any of the embodiments disclosed herein, the controller can be configured to receive a request to connect to the mobile access point from the wireless device. The controller can be configured to receive location data from the wireless device. The controller can be configured to predict an optimal location by determining a location with line of sight conditions between the mobile access point and the wireless device. The optimal location determination can be based at least in part on the map of one or more obstacles with the space and the location data from the wireless device. The controller can be configured to output a first control signal to the actuator to move the mobile access point to the optimal location.

Another embodiment of the present disclosure provides a wireless network system. The wireless network system can comprise a mobile access point, a plurality of wireless devices, and an actuator. The actuator can be configured to move the mobile access point to a position having improved line of sight conditions between the mobile access point and the plurality of wireless devices.

In any of the embodiments disclosed herein, the mobile access point can be disposed on a ceiling within a space.

In any of the embodiments disclosed herein, the actuator can be a linear actuator.

In any of the embodiments disclosed herein, the wireless network system can comprise a track. The track can be configured to support the mobile access point.

In any of the embodiments disclosed herein, the wireless network system can comprise a controller. The controller can be configured to output one or more control signals to the actuator to move the mobile access point.

In any of the embodiments disclosed herein, the controller can be configured to receive request to connect to the mobile access point from each of the plurality of wireless devices. The controller can be configured to receive location data from each of the plurality of wireless devices. The controller can be configured to determine an optimal location of the mobile access point. The optimal location of the mobile access point can be a location with a maximum number of line of sight conditions between the mobile access point and each of the plurality of wireless devices. The controller can be configured to output a first control signal to the actuator to move the mobile access point to the optimal location.

In any of the embodiments disclosed herein, the controller can be configured to receive request to connect to the mobile access point from each of the plurality of wireless devices. The controller can be configured to receive location data from each of the plurality of wireless devices. The controller can be configured to receive connectivity data between the mobile access point and each of the plurality of wireless devices when the mobile access point is located at a first location. The controller can be configured to determine if there is an obstacle in the line of sight between the mobile access point and each of the plurality of wireless devices at the first location. The line of sight determination can be based at least in part on the connectivity data between the mobile access point and each of the plurality of wireless devices. The controller can be configured to output a first control signal to the actuator to move the mobile access point to a second location. The controller can be configured to determine if there is an obstacle in the line of sight between each of the plurality of wireless devices and the mobile access point at the second location. The line of sight determination can be based at least in part on the connectivity data between the mobile access point and each of the plurality of wireless devices. The controller can be configured to repeat outputting the one or more control signals to the actuator to move the mobile access point and determining if there is an obstacle in the line of sight between the mobile access point and each of the plurality of wireless devices. The controller can be configured to then repeat moving the mobile access point to find a location for each of the plurality of wireless devices where there is a clear line of sight for each of the plurality of wireless devices and the mobile access point.

In any of the embodiments disclosed herein, the controller can be configured to create, through machine learning, a map of one or more obstacles within a space. The map of obstacles within a space can be based at least in part on a plurality of line of sight determinations made by the controller.

In any of the embodiments disclosed herein, the controller can be configured to receive a request from each of the plurality of wireless devices to connect to the mobile access point. The controller can be configured to receive location data from each of the plurality of wireless devices. The controller can be configured to predict an optimal location of the mobile access point by determining a location with a maximum number of line of sight conditions between the mobile access point and each of the plurality of wireless devices. The optimal location determination can be based at least in part on the map of one or more obstacles with the space and the location data from each of the plurality of wireless devices. The controller can be configured to output a first control signal to the actuator to move the mobile access point to the optimal location.

Another embodiment of the present disclosure provides a controller. The controller can be in wired or wireless communication with an actuator. The controller can be configured to move a mobile access point by outputting one or more control signals to the actuator. The controller can comprise a processor and memory. The memory can store instruction that, when executed by the processor, are configured to cause the controller receive a request from a wireless device to connect to the mobile access point. The memory can store instruction that, when executed by the processor, are configured to cause the controller to receive location data from the wireless device corresponding to a location of the wireless device. The memory can store instruction that, when executed by the processor, are configured to cause the controller to receive connectivity data between the wireless device and the mobile access point when the mobile access point is located at a first location. The memory can store instruction that, when executed by the processor, are configured to cause the controller to determine if there is an obstacle in the line of sight between the wireless device and the mobile access point at the first location. The line of site determination can be based at least in part on the connectivity data between the wireless device and the mobile access point. The memory can store instruction that, when executed by the processor, are configured to cause the controller to output a first control signal to the actuator to move the mobile access point to a second location. The memory can store instruction that, when executed by the processor, are configured to cause the controller to determine if there is an obstacle in the line of sight between the wireless device and the mobile access point at the second location. The line of sight determination can be based at least in part on the connectivity data between the wireless device and the mobile access point. The memory can store instruction that, when executed by the processor, are configured to cause the controller to repeat outputting the one or more control signals to the actuator to move the mobile access point and determining if there is an obstacle in the line of sight between the wireless device and the mobile access point.

In any of the embodiments disclosed herein, the memory can store instruction that, when executed by the processor, are configured to create, through machine learning, a map of one or more obstacles within a space. The map of obstacles can be based at least in part on a plurality of line of sight determinations made by the controller.

In any of the embodiments disclosed herein, the memory can store instruction that, when executed by the processor, are configured to receive a request to connect to the mobile access point from the wireless device. The memory can store instruction that, when executed by the processor, are configured to receive location data from the wireless device. The memory can store instruction that, when executed by the processor, are configured to predict an optimal location by determining a location with line of sight conditions between the mobile access point and the wireless device. The optimal location can be based at least in part on the map of one or more obstacles with the space and the location data from the wireless device. The memory can store instruction that, when executed by the processor, are configured to output a first control signal to the actuator to move the mobile access point to the optimal location.

Another embodiment of the present disclosure provides a controller. The controller can be in wired or wireless communication with an actuator. The controller can be configured to move a mobile access point by outputting one or more control signals to the actuator. The controller can comprise a processor and memory. The memory can store instruction that, when executed by the processor, are configured to receive requests from a plurality of wireless devices to connect to the mobile access point. The memory can store instruction that, when executed by the processor, are configured to receive location data from each of the plurality of wireless devices. The memory can store instruction that, when executed by the processor, are configured to receive connectivity data between the mobile access point and each of the plurality of wireless devices when the mobile access point is located at a first location. The memory can store instruction that, when executed by the processor, are configured to determine if there is an obstacle in the line of sight between the mobile access point and each of the plurality of wireless devices at the first location. The line of sight determination can be based at least in part on the connectivity data between the mobile access point and each of the plurality of wireless devices. The memory can store instruction that, when executed by the processor, are configured to output a first control signal to the actuator to move the mobile access point to a second location. The memory can store instruction that, when executed by the processor, are configured to determine if there is an obstacle in the line of sight between each of the plurality of wireless devices and the mobile access point at the second location. The line of sight determination can be based at least in part on the connectivity data between the mobile access point and each of the plurality of wireless devices. The memory can store instruction that, when executed by the processor, are configured to repeat outputting the one or more control signals to the actuator to move the mobile access point and determining if there is an obstacle in the line of sight between the mobile access point and each of the plurality of wireless devices. The memory can store instruction that, when executed by the processor, are configured to and then repeat moving the mobile access point to find a location for each of the plurality of wireless devices where there is a clear line of sight for each of the plurality of wireless devices and the mobile access point.

In any of the embodiments disclosed herein, the memory can store instruction that, when executed by the processor, are configured to create, through machine learning, a map of one or more obstacles within a space. The map of obstacles can be based at least in part on a plurality of line of sight determinations made by the controller.

In any of the embodiments disclosed herein, the memory can store instruction that, when executed by the processor, are configured to receive a request from each of the plurality of wireless devices to connect to the mobile access point. The memory can store instruction that, when executed by the processor, are configured to receive location data from each of the plurality of wireless devices. The memory can store instruction that, when executed by the processor, are configured to predict an optimal location of the mobile access point by determining a location with a maximum number of line of sight conditions between the mobile access point and each of the plurality of wireless devices. The optimal location can be based at least in part on the map of one or more obstacles with the space and the location data from each of the plurality of wireless devices. The memory can store instruction that, when executed by the processor, are configured to output a first control signal to the actuator to move the mobile access point to the optimal location.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features can also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
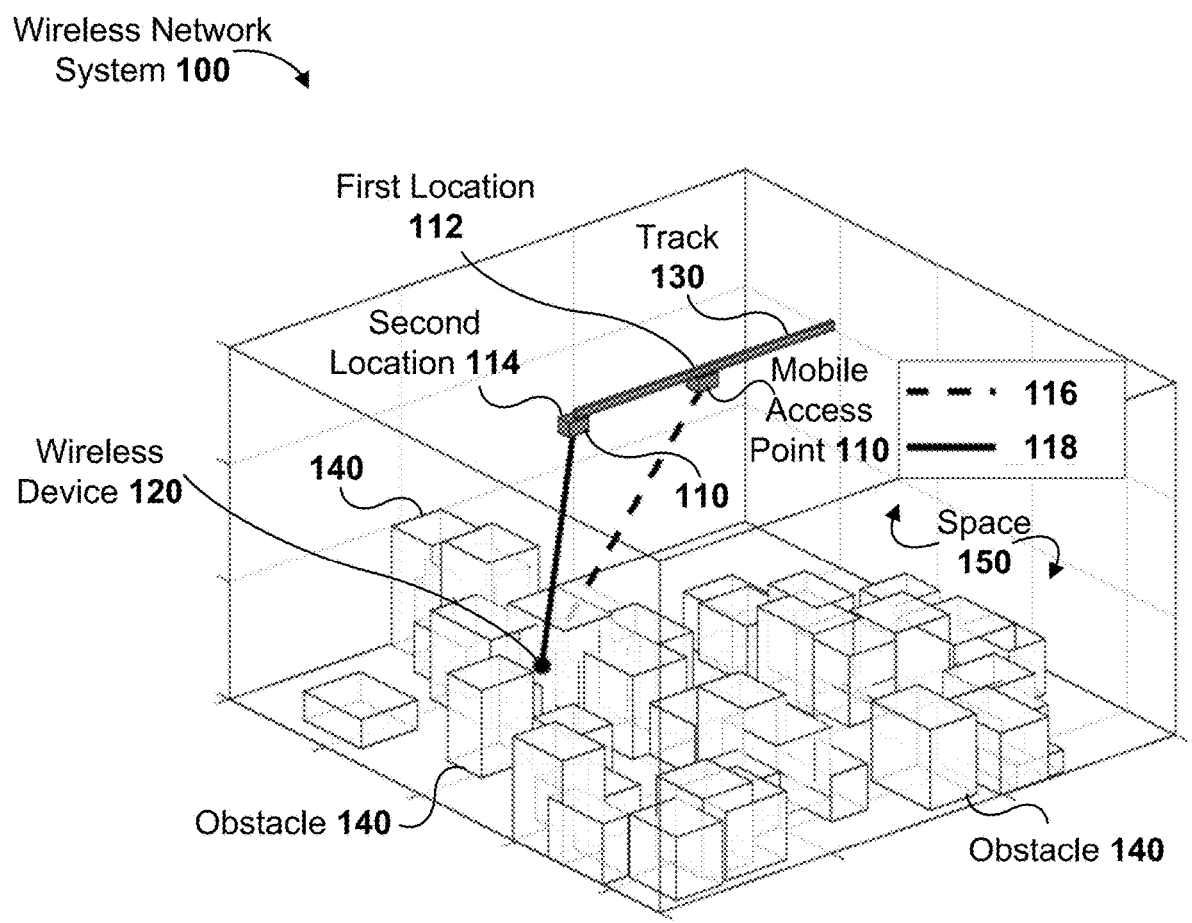
FIG. 1 provides an isometric view of an example wireless network system, in accordance with the present disclosure.

Throughout this disclosure a wireless network system is described. For example, a wireless network system that can include a mobile access point that can move within a space to provide improved connectivity with wireless devices, for example by improving line of sight conditions between the access point and wireless devices. As such, the wireless network system can dynamically provide high connectivity and throughput to wireless devices.

While the disclosed technology is described throughout this disclosure in relation to wireless network applications, those having skill in the art will recognize that the disclosed technology is not so limited and can be applicable to other scenarios and applications. For example, it is contemplated that the disclosed technology can be applicable to any wireless communication system.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to examples of the disclosed technology, examples of which are illustrated in the accompanying drawings and disclosed herein. Wherever convenient, the same reference numbers will be used throughout the drawings to refer to the same or like parts.

Referring now to the drawings, in which like numerals represent like elements, examples of the present disclosure are herein described. As will be described in greater detail, the present disclosure can include a system and method for a wireless network system with mobile access point. To provide a background of the system described in the present disclosure, components of the wireless network system are shown in FIGS. 1 and 2.

To facilitate an understanding of the principles and features of the present disclosure, various examples of the disclosed technology are explained herein. The components, steps, and materials described herein as making up various elements of the disclosed technology are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 2:
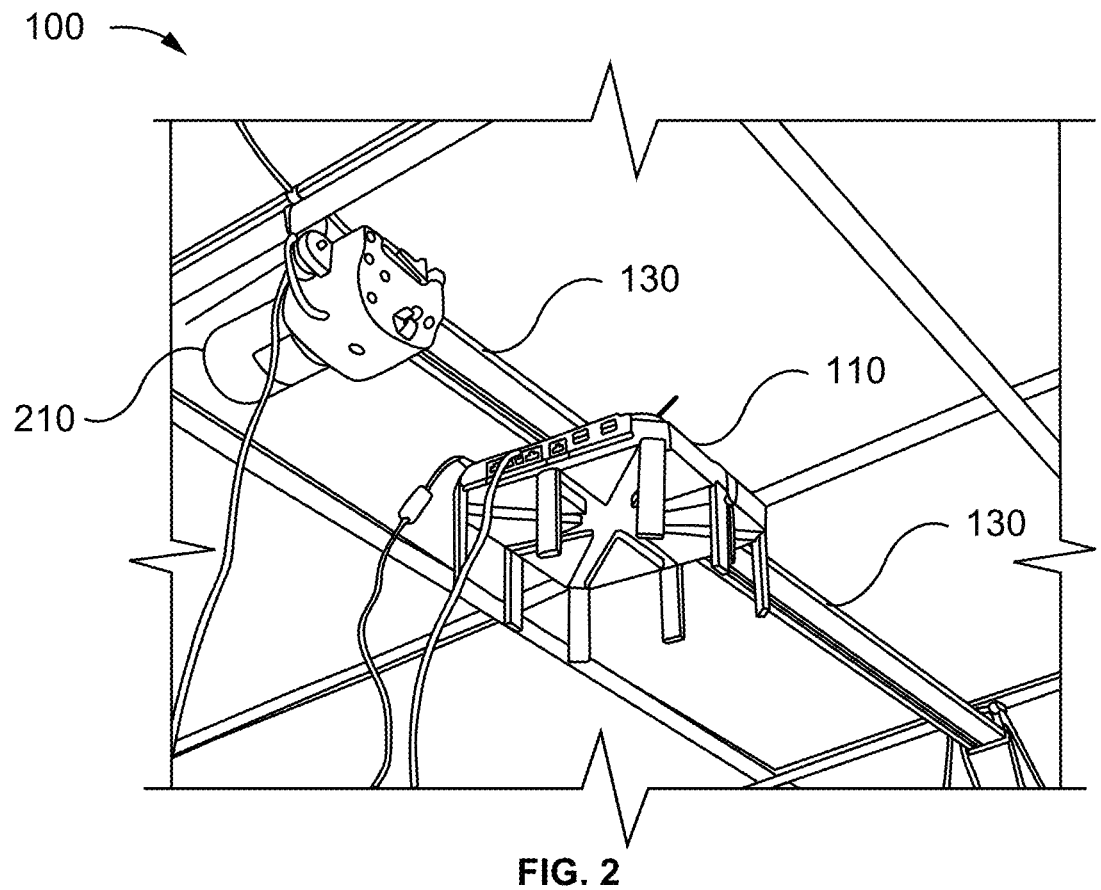
FIG. 2 provides a perspective view of an example wireless network system, in accordance with the present disclosure.

As shown in FIG. 1, the disclosed technology can include a wireless network system 100. The wireless network system 100 can include a mobile access point 110. As explained more fully herein, the mobile access point 110 can move to an optimal location to provide improved line of sight conditions with one or more wireless devices 120 located within a space 150. For example, the mobile access point 110 can move on a track 130 to a location on the ceiling to provide improved line of sight conditions with one or more wireless devices 120 located within a space 150. For example, the mobile access point 110 can move to a location with improved line of sight conditions with a wireless device 120 when there are one or more obstacles 140 between the mobile access point 110 and the wireless device 120. In such a manner, the wireless network system 100 can provide wireless connectivity between a mobile access point 110 and one or more wireless devices 120 without requiring multiple stationary access points.

The mobile access point 110 can be any access point known in the art that enables wireless devices to connect to a network via the mobile access point 110. The mobile access point 110 can be connected to a network connection. For example, the mobile access point 110 can be in wired or wireless communication with a router. Alternatively, or in addition, the mobile access point 110 can include an integrated router. The mobile access point 110 can enable wireless devices to connect to a network. For example, the mobile access point can allow Wi-Fi devices to connect to the internet. The network can be any network known in the art. For example, the network can be an IEEE 802.1 lad network (60 GHz). Alternatively, or in addition, the network can be IEEE 802.11ac (5 GHz) and/or 802.11n (2.4 GHz). The mobile access point 110 can be a multi-band configuration. For example, the mobile access point can include a dual-band or tri-band configuration.

The wireless network system 100 can include a wireless device 120. Additionally, the wireless network system 100 can include a plurality of wireless devices. The wireless device 120 can be any wireless network connected device. For example, the wireless device 120 can include, but is not limited to, a phone, tablet, laptop, television, smart device, internet of things device, and the like, or any combination thereof.

The mobile access point 110 can be configured to move between a plurality of locations within a space 150. For example, the mobile access point 110 can move between a plurality of locations on a track 130. The track 130 can be located on a ceiling within a space 150. For example, the track 130 can be located on a ceiling to minimize issues with navigating the mobile access point 110 around obstacles. Alternatively, the track 130 can be located anywhere within a space 150. For example, the track 130 can be located on a wall and/or floor. The track 130 can be a linear track. Alternatively, the track 130 can be nonlinear.

The mobile access point 110 can be configured to move to an optimal location to allow for improved connectivity between the mobile access point 110 and one or more wireless devices 120. For example, the mobile access point 110 can move to a location with improved line of sight conditions with the one or more wireless devices 120. As illustrated, the mobile access point 110 can be at a first location 112. A wireless device 120 can attempt to connect to the mobile access point 110 at the first location 112 with a non-line-of-sight condition 116. For example, an obstacle 140 can be in the line of sight between the wireless device 120 and the mobile access point 110 at a first location 112. An obstacle 140 can be any object that impairs a wireless signal. For example, an obstacle 140 can include, but is not limited to, a piece of furniture, a wall, a person, and the like, or any combination thereof. As illustrated, the mobile access point 110 can then move to a second location 114 with a line of sight condition 118 with the wireless device 120.

As shown in FIG. 2, the disclosed technology can include an actuator 210. The actuator 210 can move the mobile access point 110 to a plurality of locations. For example, the actuator can be a linear actuator that can move the mobile access point 110 along a track 130 in a first and second direction (e.g., forward and backward). The actuator 210 can include, but is not limited to, an electric actuator, linear actuator, mechanical actuator, and the like, or any combination thereof.

Alternatively, or in addition, the wireless network system 100 can include any movement system to move the mobile access point 110 to a plurality of locations within a space 150. For example, the movement system to move the mobile access point 110 can employ one or more tracks, guide wires, pulleys, motors, gears, wheels, gear racks, rack and pinion, bearings, guide rails, winches, and the like, or any combination thereof.

The wireless network system 100 disclosed herein can further include a controller 600. For example, the controller 600 can be configured to receive data, make determinations, and output instructions. The controller 600 can include, but is not limited to, a dedicated controller, a locally located controller, a remotely located controller (e.g., backend server), and the like, or any combination thereof.

Figure 6:
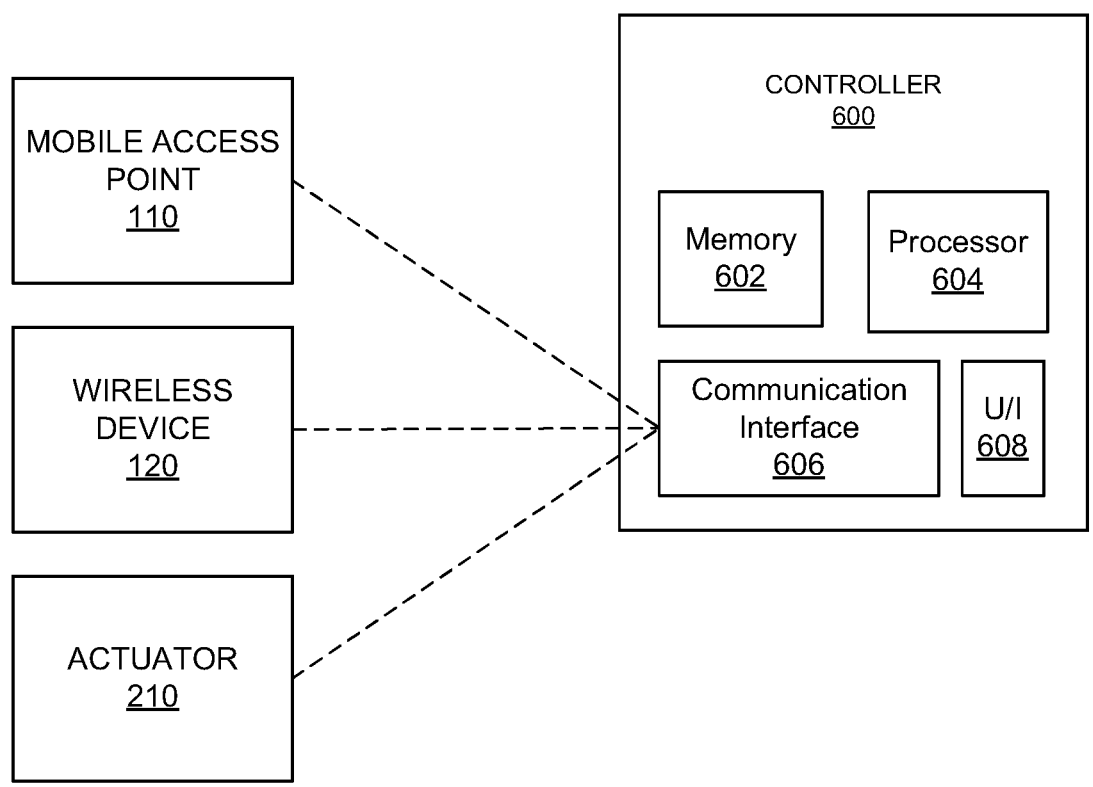
FIG. 6 provides a schematic illustrating an example controller, in accordance with the present disclosure.

Referring to FIG. 6, which provides a schematic illustrating an example controller 600, the controller 600 can include memory 602, a processor 604, a communication interface 606, and/or a user interface 608. The controller 600 can communicate with one or more sensors and/or devices. For example, the controller 600 can receive data from a mobile access point 110, a wireless device 120, and/or an actuator 210. The controller can output instructions to a mobile access point 110, a wireless device 120, and/or an actuator 210.

Figure 7:
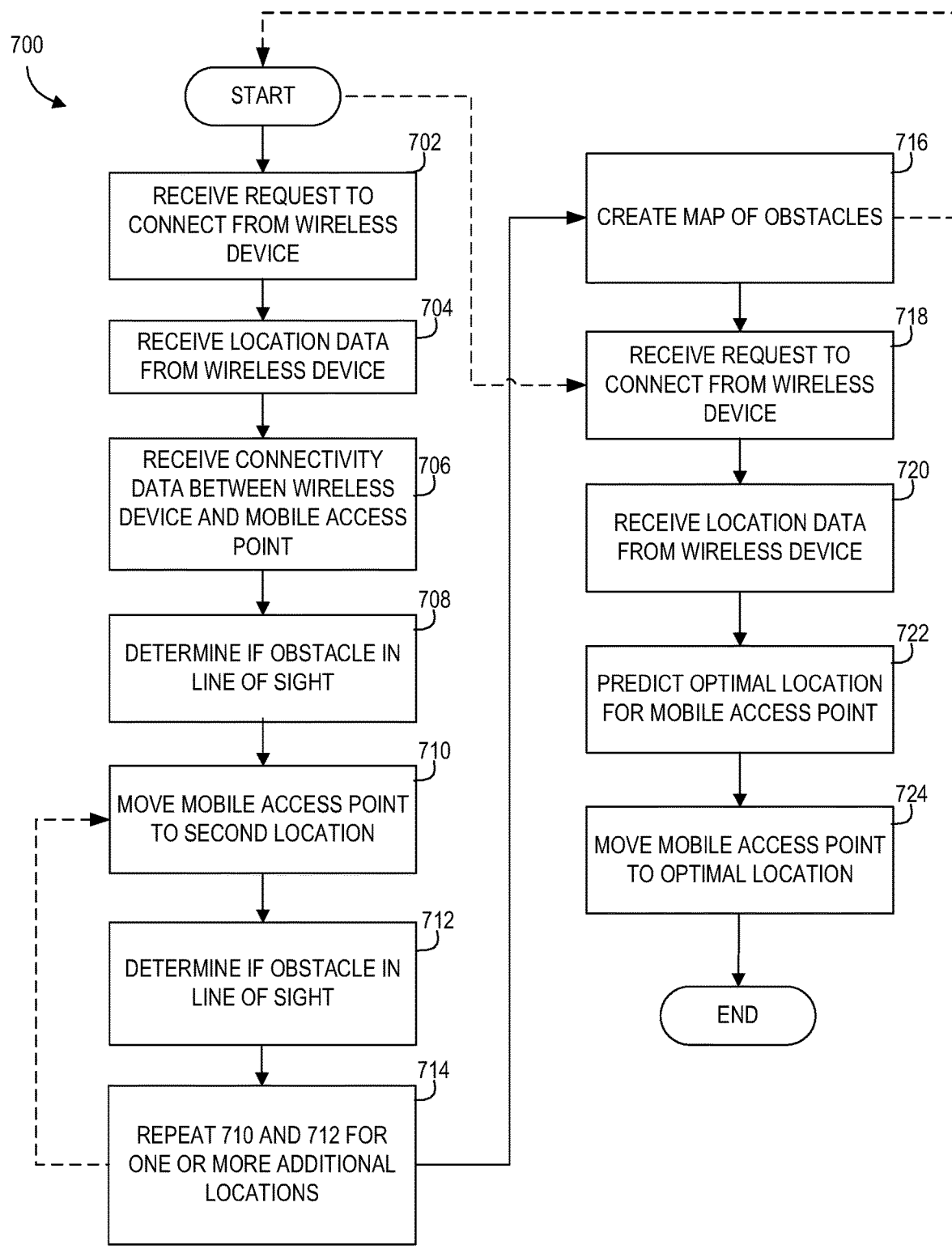
FIG. 7 provides a flow chart illustrating an example method for controlling a wireless network system, in accordance with the present disclosure.

The disclosed technology can include methods for controlling a mobile access point (e.g., mobile access point 110), such as method 700, which is illustrated in FIG. 7. Method 700 and/or any other method described herein can be performed in full or in part by a controller or computer, such as controller 600 described herein.

The method 700 can include the controller 600 receiving, at 702, a request from a wireless device to connect to the mobile access point. At 704, method 700 can include receiving location data from the wireless device corresponding to a location of the wireless device (e.g., wireless device 120). At 706, method 700 can include receiving connectivity data between the wireless device and the mobile access point. The mobile access point can be located at the first location. At 708, method 700 can include determining if there is an obstacle in the line of sight between the wireless device and the mobile access point at the first location based at least in part on the connectivity data between the wireless device and the mobile access point. At 710, method 700 can include outputting a first control signal to the actuator to move the mobile access point to a second location. At 712, method 700 can include determining if there is an obstacle in the line of sight between the wireless device and the mobile access point at the second location based at least in part on the connectivity data between the wireless device and the mobile access point. At 714, method 700 can include repeating outputting the one or more control signals to the actuator to move the mobile access point and determining if there is an obstacle in the line of sight between the wireless device and the mobile access point.

Alternatively, or in addition, the method 700 can further include the controller 600 creating, at 716, method 700 can include mapping (e.g., via machine learning) one or more obstacles within a space based at least in part on a plurality of line of sight determinations made by the controller. For example, the controller 600 can dynamically create a map of one or more obstacles within the space through an iterative process by repeating one or more of the steps of method 700. For example, the map of one or more obstacles within the space can be a connectivity matrix based on one or more line of sight determinations. The connectivity matrix can be dynamically updated as additional line of sight determinations are made by the controller 600. For example, the connectivity matrix can be updated to reflect the addition and/or removal of an obstacle within the space.

Alternatively, or in addition, the method 700 can further include the controller 600 receiving, at 718, a request to connect to the mobile access point from the wireless device. At 720, method 700 can include receiving location data from the wireless device. At 722, method 700 can include predicting an optimal location by determining a location with line of sight conditions between the mobile access point and the wireless device based at least in part on the map of one or more obstacles within the space and the location data from the wireless device. At 724, method 700 can include outputting a first control signal to the actuator to move the mobile access point to the optimal location.

Figure 8:
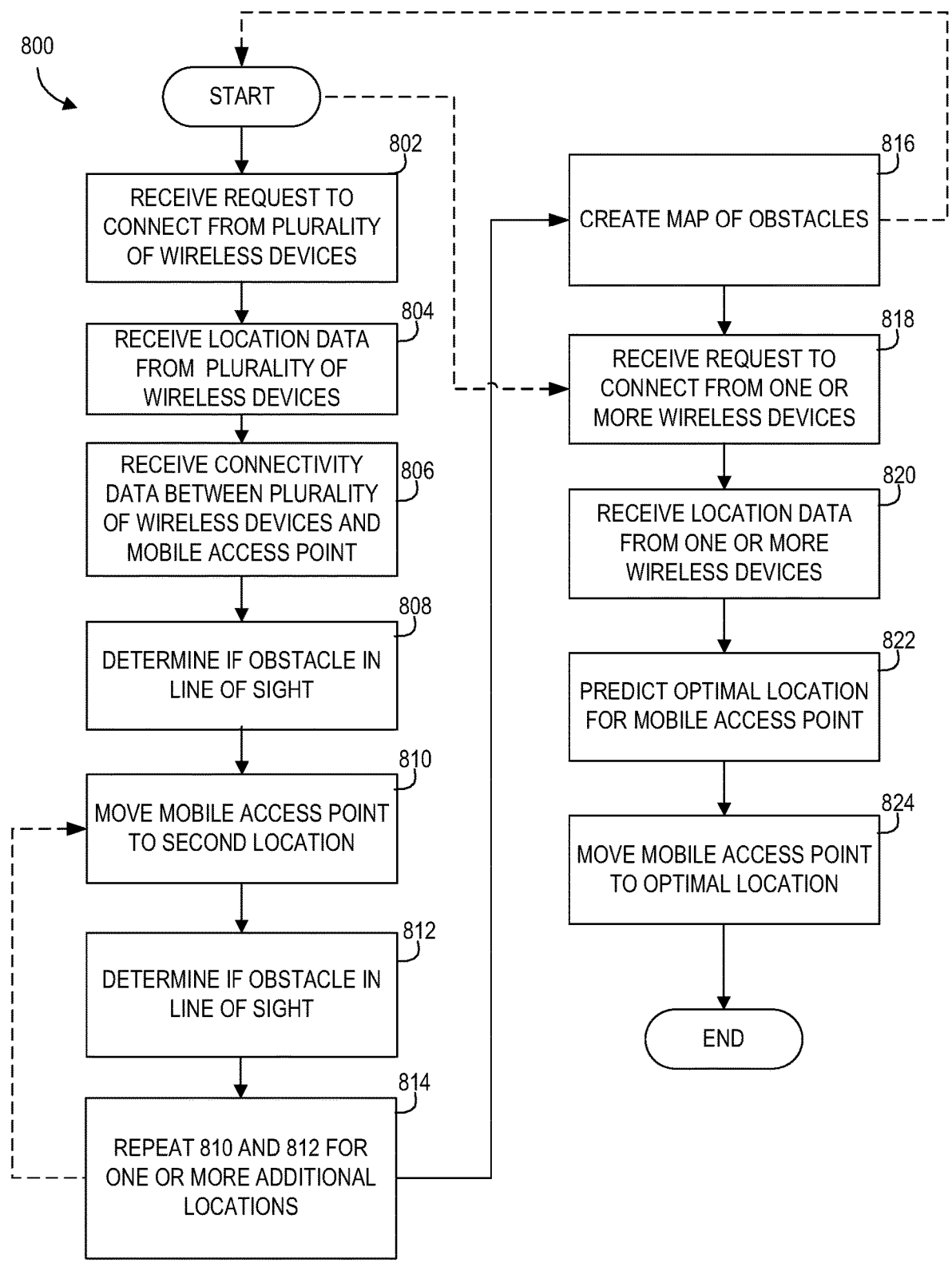
FIG. 8 provides a flow chart illustrating an example method for controlling a wireless network system, in accordance with the present disclosure.

The disclosed technology can include methods for controlling a mobile access point 110, such as method 800, which is illustrated in FIG. 8. Method 800 and/or any other method described herein can be performed in full or in part by a controller or computer, such as controller 600 described herein.

The method 800 can include the controller 600 receiving, at 802, requests from a plurality of wireless devices to connect to the mobile access point. At 804, method 800 can include receiving location data from each of the plurality of wireless devices. At 806, method 800 can include receiving connectivity data between the mobile access point and each of the plurality of wireless devices, the mobile access point being located at a first location. At 808, method 800 can include determining if there is an obstacle in the line of sight between the mobile access point and each of the plurality of wireless devices at the first location based at least in part on the connectivity data between the mobile access point and each of the plurality of wireless devices. At 810, method 800 can include outputting a first control signal to the actuator to move the mobile access point to a second location. At 812, method 800 can include determining if there is an obstacle in the line of sight between each of the plurality of wireless devices and the mobile access point at the second location based at least in part on the connectivity data between the mobile access point and each of the plurality of wireless devices. At 814, method 800 can include repeating outputting the one or more control signals to the actuator to move the mobile access point and determining if there is an obstacle in the line of sight between the mobile access point and each of the plurality of wireless and then repeat moving the mobile access point to find a location for each of the plurality of wireless devices where there is a clear line of sight for each of the plurality of wireless devices and the mobile access point.

Alternatively, or in addition, the method 800 can further include the controller 600 creating, at 816, through machine learning, a map of one or more obstacles within a space based at least in part on a plurality of line of sight determinations made by the controller. For example, the controller 600 can dynamically create a map of one or more obstacles within the space through an iterative process by repeating one or more of the steps of method 800. For example, the map of one or more obstacles within the space can be a connectivity matrix based on one or more line of sight determinations. The connectivity matrix can be dynamically updated as additional line of sight determinations are made by the controller 600. For example, the connectivity matrix can be updated to reflect the addition and/or removal of an obstacle within the space.

Alternatively, or in addition, the method 800 can further include the controller 600 receiving, at 818, a request from one or more wireless devices to connect to the mobile access point. At 820, method 800 can include receiving location data from each of the one or more wireless devices. At 822, method 800 can include predicting an optimal location of the mobile access point by determining a location with a maximum number of line of sight conditions between the mobile access point and each of the one or more wireless devices based at least in part on the map of one or more obstacles within the space and the location data from each of the plurality of wireless devices. At 824, method 800 can include outputting a first control signal to the actuator to move the mobile access point to the optimal location.

The following examples further illustrate aspects of the present disclosure. However, they are in no way a limitation of the teachings or disclosure of the present disclosure as set forth herein.

EXAMPLES

Line-of-Sight ("LOS") can be a critical requirement for mmWave communication. In this disclosure, use of access point ("AP") mobility to better the LOS conditions for clients within an indoor IEEE 802.11ad network is described. Specifically, the disclosure provides a detailed case for a ceiling-mounted mobile AP and present WiMove, a system and/or method that addresses the discovery problem for a ceiling-mounted mobile AP using a machine learning ("ML") algorithm. The algorithm relies purely on the connectivity matrix between clients and the AP in order to decide if and where the AP should move to for the maximum LoS performance. As will be sown, WiMove maximizes LoS conditions in the network with an accuracy of up to 84%. Using a prototype implementation, it is shown that WiMove can perform on an average 219% and 129% better than a static AP scenario and other approaches for AP mobility respectively.

Introduction

The 802.11ad or WiGig standard operates in the 60 GHz frequency band (mmWave) with a bandwidth of 1760 MHz and can deliver multi-gigabit (~7 Gbps) performance. While the potential performance is quite promising, the technology is vulnerable to non-line-of-sight (NLOS) conditions compared to conventional WiFi. The communication performance drops significantly when the wireless link has an obstacle such as a wall or cabinet in its way. Given the fickle nature of the wireless communication when relying on 802.11ad, it is expected it may be used in a dual-band (or tri-band) configuration that works along with 802.11ac (5 GHz frequency band) (and 802.11n (2.4 GHz frequency band) if tri-band).

In this context, it is likely that 802.11ad networks can deliver considerably better performance, but that the performance cannot be assured and will be dependent on the existence of LoS conditions. LoS conditions are a function of the physical environment, but prior communication technologies had no ability to improve the conditions when necessary. The WiFi AP, if enabled to move intelligently, could discover an optimal location for itself and move to that location in order to offer the best possible performance for the stations (STAs). This is especially an attractive degree of freedom for mmWave technology such as 802.11ad, where the creation of LOS with STAs can have a profound impact on performance.

As described above, this disclosure explores a model of a ceiling-based AP that can move on a linear actuator. It is first shown that a ceiling-based AP with 1D mobility can perform significantly better than a static AP, multiple static APs, and a floor-based mobile AP. The simulation-based study below is complimented with analytical results that show how the 1D actuator should be mounted at a specific location on the ceiling for maximizing performance.

This disclosure further shows that, unlike in floor-based AP mobility where the navigation problem is the most challenging issue, for ceiling-based AP mobility, the discovery problem is the most challenging. Specifically, the discovery problem is defined as how the AP identifies the ideal location for itself to move to in order to serve the greatest number of STAs with LOS conditions. A simple brute force approach is presented that suffices for network initialization where the AP traverses the full length of the 1D actuator before calculating the optimal location. Such a technique, however, can be prohibitively expensive if used for recalculating the optimal position when the network conditions (STAs or obstacles) change. This recalculation problem is described in this disclosure. Specifically, WiMove, a machine-learning algorithm-based solution for the recalculation of the optimal AP position that relies solely on the connectivity matrix between the STAs and the AP in the network is presented. The algorithm trains itself to predict, simply based on the connectivity matrix, whether a new STA in the network is likely to have connectivity to the different AP positions. Thus, when new STAs enter the network, the AP uses the prediction algorithm to decide whether repositioning is needed and, if so, where to move to. When STAs leave the network, the decision of whether to move and where to move to is deterministic. Similarly, for obstacle dynamics (obstacles added, removed, or moved), the AP recalculates the connectivity matrix simply based on which LOS links have been compromised, and which LOS links have been newly created. Using both simulations and experimental evaluation, this disclosure shows that WiMove performs well under a variety of conditions.

This disclosure describes WiMove, a machine-learning algorithm-based solution for the AP to determine the ideal location along the actuator from where it can serve the greatest number of wireless services or stations ("STAs")

with LOS conditions. WiMove uses a brute-force search algorithm during network initialization and resets, but uses a novel prediction mechanism to recalculate its position when network conditions change. It is shown that WiMove can maximize LOS connections for STAs both during network setup and when network conditions change.

The WiMove Ceiling-Based AP Mobility Solution

This disclosure proposes the WiMove solution to leverage the potential benefits provided by a ceiling-based self-positioning ("SP") AP platforms. WiMove is able to predict the optimal location for the AP and enables the AP to move to the optimal location in real time given dynamic scenarios. The network model and objective function is first defined to quantify the optimal location for the AP. A naive brute-force algorithm is presented and its limitations are discussed. The limitations are addressed through the ML algorithm. Finally, the ML solution is evaluated extensively through simulations.

A. Network Model and Objective Function

By way of example, a single room with a 1D actuator is considered, which is mounted at the expected optimal location. The AP is attached to the platform and able to move to any specific location on the platform, and there are mt STAs that would like to connect with the AP using 802.11ad at time instance t. From a practical standpoint, this disclosure considers P discrete available positions for AP. For both AP and STAs, this disclosure assumes both legacy WiFi and 802.11ad are available. The information on STAs' intention to connect to the AP is transmitted from STAs to the AP through the 5 GHz band. The current position information of the AP is broadcast to the STAs, also through the 5 GHz. The AP controller identifies and moves the AP to the estimated closest optimal location (which maximizes the network performance). To maximize network performance, this disclosure first defines the objective function for the SP AP platform. For any typical room in an indoor environment, the transmission ranges are very limited due to the room size limitation. Thus, LOS connectivity between AP and STA becomes the most important metric to boost link performance. To be specific, any link with LOS connectivity between AP and STA should have reasonably high data rate. Additionally, as the number of LOS connectivity links is maximized, it can achieve maximum network fairness. Therefore, in the proposed framework, our goal is to maximize the number of LOS connectivity links as specified by the following objective function:

$$\max_p \sum_{i=1}^{m_t} LOS_{i,p},$$

where $LOS_{i,p}$ represents the LOS connectivity between AP at location p and $i^{th}$ STA. $LOS_{i,p}$ is a binary parameter, where 1 represents LOS connectivity and 0 represents NLOS connectivity. Here, $p \in [1, P]$, where P denotes the total possible discrete locations of AP.

B. A Simple Brute-Force Strategy

A brute-force solution for this problem is to have the AP periodically traverse the entire platform in order to identify the location with the maximum number of LOS STAs and then move to the optimal location. Assuming the AP takes t seconds to traverse the entire platform, it will take another expected duration of 0.5*t seconds for the AP to move to the optimal location. Thus, the overall time for optimization through periodic traversal is at least 1.5*t seconds which could range from tens of seconds to a few minutes given the speed of considered linear actuator.

In this context, the LOS connectivity between STAs and possible locations of the AP through ML methods can both be predicted. This would prevent traversing to all possible locations, and hence, with accurate prediction, the expected time for the AP to move to the optimal location will only be 0.5*t seconds, which is only $\frac{1}{3}^{rd}$ of the time consumption as compared to the brute-force search.

C. ML Problem Formulation

Here, the disclosure formalizes the problem definition and presents an algorithm for data-driven learning to predict the LOS connectivity between the STAs and the possible AP locations.

An environment with m STAs with known LOS connectivity between STAs to STAS, and STAs to possible AP locations is considered. As the $(m+1)^{th}$ STA moves in the environment, the LOS connectivity of $(m+1)^{th}$ STA with other STAs is also known to us. Given this information, our goal is to predict the connectivity of $(m+1)^{th}$ STA with all possible P AP locations. In this simplistic scenario, the environment can be assumed static, i.e., the obstacle map and the STA locations in the given environment are fixed.

Mathematically speaking, given the STA to STA LOS matrix, $STA\_STA_{LOS} \in \{0,1\}^{(m+1) \times (m+1)}$, and STA to AP location LOS matrix, $STA\_AP_{LOS} \in \{0,1\}^{m \times P}$, this disclosure aims to find the LOS connectivity of $(m+1)^{th}$ STA with P possible AP locations $STA\_AP_{LOS}^{m+1} \in \{0,1\}^{1 \times P}$. Further, this disclosure explains how the distance and sector ID information can be incorporated into the ML algorithm to boost the prediction performance.

D. ML Algorithm

For a given obstacle map in a 3D environment, the LOS connectivity of two points can be easily computed. In case the obstacle map is fixed but unknown, a set of labeled examples can reveal the information about unknown obstacle map (to some extent), which could further be utilized to predict the LOS connectivity for the newly added STA (i.e. $(m+1)^{th}$ STA). Thus, keeping the fact in mind that the underlying relationship between input and output is actually a skewed representation of the fixed obstacle map, this disclosure utilizes parametric function approximation approaches to learn this latent structure. While it might not be possible to learn the full obstacle map, this disclosure aims to extract as much possible information in an attempt to maximize the prediction accuracy. In our ML-based LOS connectivity prediction framework, this disclosure uses artificial neural networks as a recipe of parametric function approximation.

Input features and the output: For now this disclosure only considers the availability of LOS connectivity information. Hence, as described earlier, the input data is present in the format of LOS connectivity matrix between STAS, $STA\_STA_{LOS} \in \{0,1\}^{(m+1) \times (m+1)}$, and LOS connectivity matrix of m STAS, $STA\_AP_{LOS} \in \{0,1\}^{m \times P}$. The labels (ground truth) are present in the format of $STA\_AP_{LOS}^{m+} \in \{0,1\}^{1 \times P}$, i.e., the LOS connectivity matrix of $(m+1)^{th}$ STA with the P AP locations.

The $STA\_STA_{LOS}$ matrix is symmetric and diagonal elements are always 1, this disclosure extracts only the (m+1)*m/2 informative bits from this matrix. this disclosure concatenates these (m+1)*m/2 features with m*P features of $STA\_AP_{LOS}$ matrix to design our $$\frac{m*(m+2p+1)}{2}$$

sized binary feature vector representing X. The network outputs $\hat{Y} \in [0, 1]^P$, a P sized probability vector representing the probability of LOS connectivity of $(m+1)^{th}$ STA with P locations.

Network: this disclosure uses a multi-layer perceptron network with a different number of hidden layers and neurons depending upon the value of m. this disclosure models the non-linearity in the model using ReLU activations and use the softmax layer for output to transform the logits to probability vectors. This disclosure uses weighted cross-entropy loss, defined as:

$$H_y(p) = \sum_i^p -y_i \log(p_i) * w + 1(1 - y_i)\log(1 - p_i).$$

Here, p represents the softmax probability of output logits, and w is calculated as the ratio of NLOS vs. LOS connectivity using training data. Using the available training data bank of N i.i.d. samples, DB={$(X_1, Y_1), (X_2, Y_2), \ldots (X_N, Y_N)$}, the loss function is minimized using stochastic gradient descent with momentum optimizer. Learning rate is decreased over time to optimize performance and increase the convergence rate. While training, this disclosure also augments the training set by a random permutation over sequence order of the STAs in the input features. This not only increases the training set size but also improves the convergence of gradient descent by avoiding any STA-order based local minimums.

ML algorithm for the LOS connectivity prediction with additional distance and sector ID information. To collect LOS or Sector feature (product of section ID and antenna ID), by overhearing sector sweep frame in the phase of sector level sweep, it is possible to collect either LOS or sector feature information. Distance can be estimated using an angular position-based estimation method. Through the distance measurement techniques, it is possible to estimate distances between STAs and STAs, and STAs and possible AP locations. Similar to the extracted features of LOS connectivity input matrix, this disclosure obtains an additional distance feature vector size $$\frac{m*(m+2p+1)}{2}$$

and unit variance as a pre-processing step. In this fashion, with given LOS and distance estimation, our feature size increases to two-fold, i.e., m*(m+2p+1). Other network architectural parameters remain intact as explained before. The same methodology is adapted to incorporate the sector ID information.

Tackling with the dynamic environments. The machine learning model presented above requires the environment to be static (i.e., fixed obstacle map and STA locations). In practice, however, the obstacle maps are quite dynamic, as the obstacle locations and STA locations could change at every time step t.

The neural-network presented in the previous section is an offline learning method, where the network weights are learned based on the data collected before deployment. Once the network is deployed for application usage, the network weights are not updated. This offline training methodology cannot be applied as is in the case of dynamic scenarios due to the two major challenges, (i) no fixed latent structure in the data points: as the obstacle map is changing with each time step, the underlying input and output relationship is no longer fixed, (ii) data availability: with the environment changing at each time step t, it is possible to obtain only a few training labels per time step which makes it really challenging to learn with the data-hungry models.

This disclosure utilizes the approach of online learning to tackle the challenges with the dynamic environment. The core idea is to update the model at every time step (as the obstacle map change is small at every time step), as to allow the model to learn the new obstacle map through the small perturbations. This update can be achieved by decreasing the learning rate. To deal with the issue of fewer training examples, this disclosure uses an intelligent data augmentation approach to increase the training set size. In an m-STA environment, this disclosure designs the neural network considering only a k subset (k<m) of STAs. For each data sample obtained at time step t, this disclosure obtains $\binom{m}{k}$ different combinations, and thus a total of $\binom{m}{k}$*k! data points are obtained with the random permutation over STA-ordering as done previously.

E. ML Algorithm Evaluation

This disclosure evaluates the performance of machine learning based LOS prediction approach through simulations. Given the advantages of ns-3 simulation, by tuning network scenarios, this disclosure is able to generate large amount of learning data samples. The scenario configurations in ns-3 follow Table 1 and STA follows obstacle dependent distribution. A total of 21 STAs are considered in the environment with 31 possible AP locations.

TABLE 1

| Default Parameters | |
|---|---|
| | Settings |
| n | 43 |
| $(\mu_x, \mu_y, \mu_z)$ (m) | (1.08, 0.56, 0.61) |
| $(\sigma_x, \sigma_y, \sigma_z)$ (m) | (0.18, 0.08, 0.21) |
| $n_{pl}$ | 2 |
| $\sigma_{fading}$ | 2.24 |
| Size of Room (m) | (9, 6, 3) |
| Platform Size (m) | 3 |
| Platform Location | Parallel to shorter edge on ceiling |
| STA Numbers | 1 |
| STA Seeds | 100 |

This disclosure splits the available data (3000 training samples) into 2 sets, the training set comprises of 70% of the data and is used to learn the network weights, and the remaining 30% set is used for testing. This disclosure uses three different metrics to evaluate algorithm performance, namely overall accuracy, precision and recall for connectivity. Precision for connectivity is the fraction of actual LOS connections out of total predicted LOS connections. Recall informs this disclosure about how accurately this disclosure can predict LOS connections out of actual LOS connections.

Network Parameters: This disclosure uses three hidden layers in the model with 256, 128 and 64 neurons. This disclosure uses a batch size of 256. The learning rate is initialized as 0.1, and decreased with a factor of 0.9 every 5 k steps. This disclosure only considers the LOS connectivity features for the prediction.

Performance: This disclosure obtains an average accuracy of 67.4%. Average precision and recall is 81.6% and 62.8% respectively. For all 31 locations, the performance metrics are found very similar with insignificant variance, and hence, in subsequent analysis, this disclosure only presents the average performance over all 31 locations.

Figure 3:
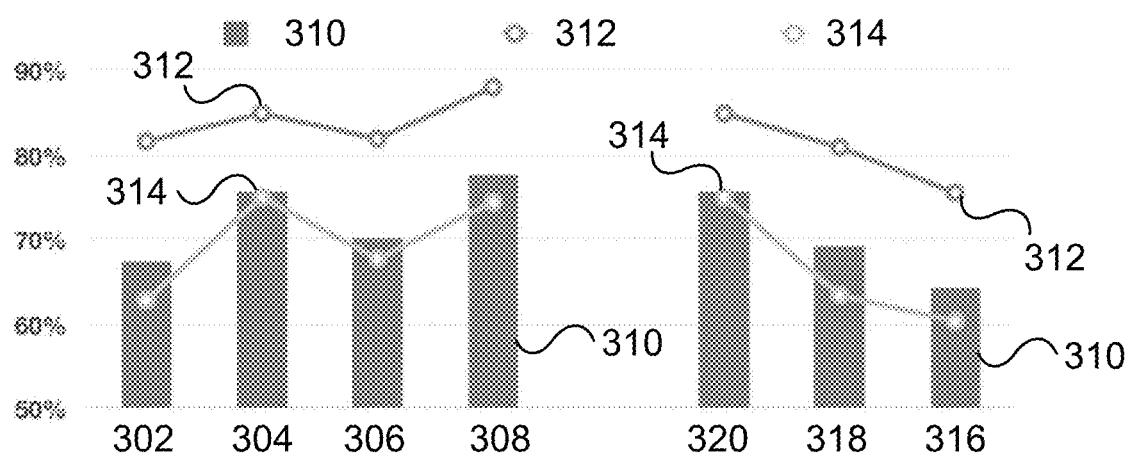
FIG. 3 shows experimentally modeled performance of wireless network systems, in accordance with the present disclosure.

Impact of the different ML features. This disclosure quantifies the impact of different input features and their combinations on the performance metrics. For 21 clients, this disclosure tests 4 different scenarios namely, (i) LOS 302, (ii) LOS with distance 304, (iii) LOS with sector ID 306, and (iv) LOS with distance and sector ID 308. FIG. 3 shows the impact of (a) different features and (b) different number of clients on prediction performance. From the left column of FIG. 3, this disclosure shows that accuracy 310 is 67.4%, 75.6%, 70.1% and 77.6% respectively for the four different set of features. Precision 312 and recall percentages 314 also vary in the same manner. These results validate the intuition that distance measurements present more information than sector ID measurements. A combination of LoS and distance measurement as input feature set provides near-optimal performance, hence, this disclosure considers LOS and distance as our default feature set for the subsequent analysis.

To analyze the impact of different obstacle maps, this disclosure obtains the performance metrics for 3 different obstacle maps for 21 clients with LOS and distance as the input feature set. This disclosure obtains the mean accuracy as 76.83% with a standard deviation of 2.4%. For precision and recall, the mean and standard deviation are (86.9%±1.81%), and (75.1%±2.2%) respectively. The low variance demonstrates that the proposed algorithm is generalizable to different scenario instances (i.e. client locations and obstacle maps).

Impact of the number of STAs. Intuitively, with the increased number of STAs, the information extraction for obstacle map should increase until a saturation point. This disclosure tests this hypothesis with 6 (316), 11 (318) and 21 (320) STAs. For 11 STAs, this disclosure reduces the hidden layer size to two layers with 128 and 64 hidden neurons. For 6 STAs, a single hidden layer with 64 neurons was used. The right column of FIG. 3 presents the performance metrics for the different number of STAs. The prediction accuracy for 6, 11 and 21 STAs is 64.3%, 69.1% and 75.6% respectively. These results show that prediction performance improves with the number of STAs.

Evaluation of the online algorithm for dynamic environments. In the ns-3 simulations for data generation, this disclosure considers only 10% of the obstacles as dynamic obstacles, which follows Poisson distribution over the given time steps. At each time step, the expected rate of obstacle movement is one unit. The movement of obstacle follows a random walk, moving towards a random direction with 0.1 m granularity. The total number of clients in the simulation were 41, out of which this disclosure considers only 21 clients for online algorithm model (k=21, m=41) for data augmentation as explained previously. The total time steps in the simulation were 145, and at each time step this disclosure gets only single data point. As only a single data sample is obtained at each time step, these results present the lower bound on the prediction accuracy in the dynamic environment.

Figure 4:
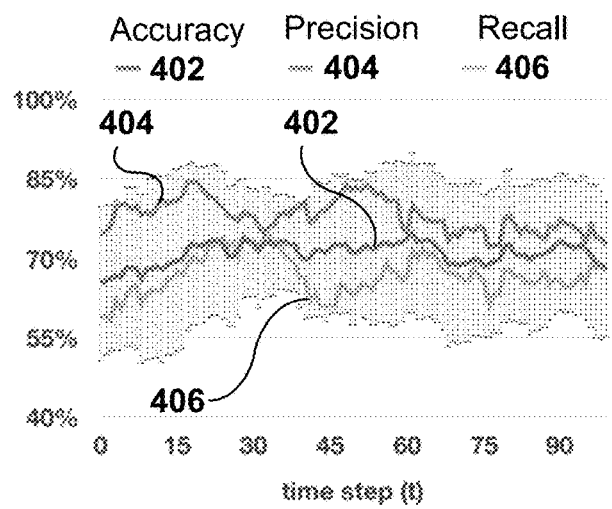
FIG. 4 shows experimentally modeled performance of wireless network systems, in accordance with the present disclosure.
Figure 5A:
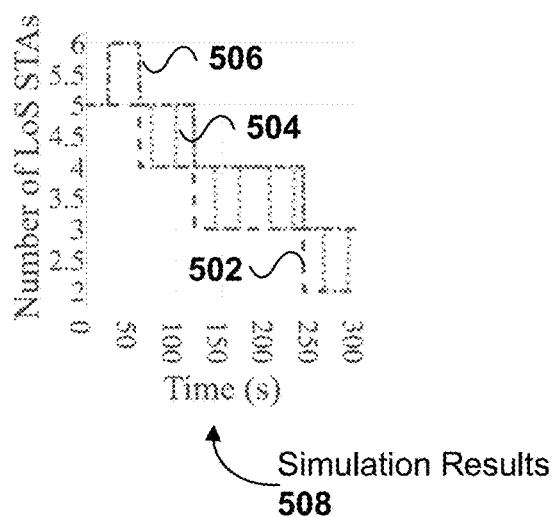
FIGS. 5A-5B show simulated and experimentally measured line of sight in wireless network systems, in accordance with the present disclosure.
Figure 5B:
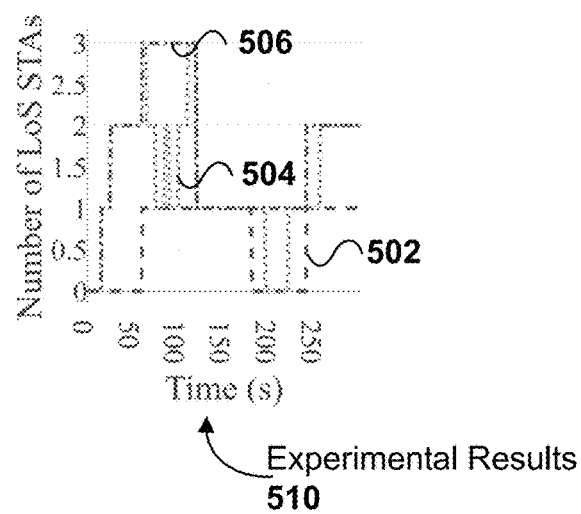
Figure 5C:
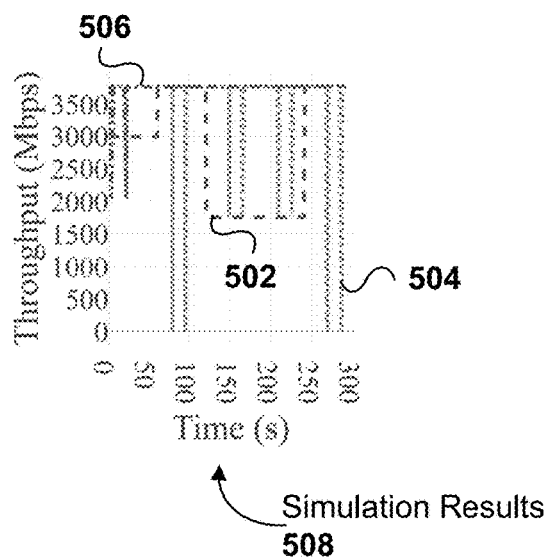
FIGS. 5C-5D show simulated and experimentally measured throughput of wireless network systems, in accordance with the present disclosure.
Figure 5D:
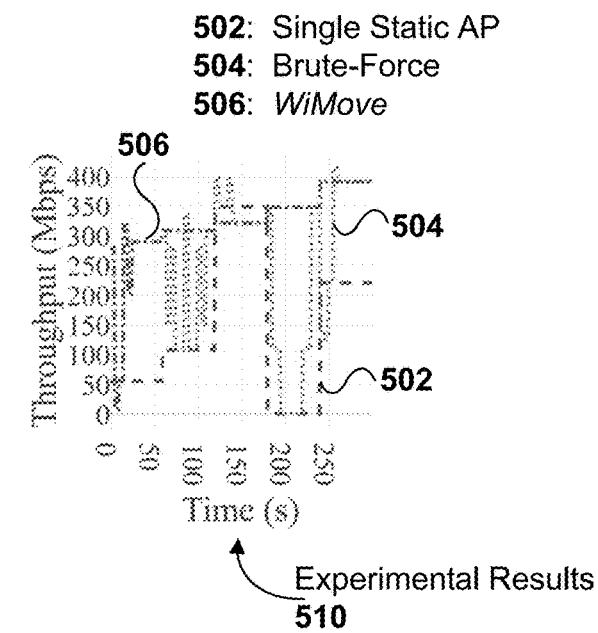
Figure 5E:
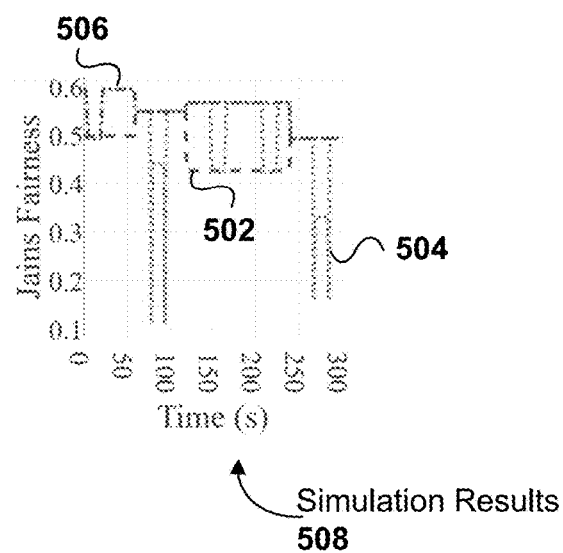
FIGS. 5E-5F show simulated and experimentally measured Jain's fairness index of wireless network systems, in accordance with the present disclosure.
Figure 5F:
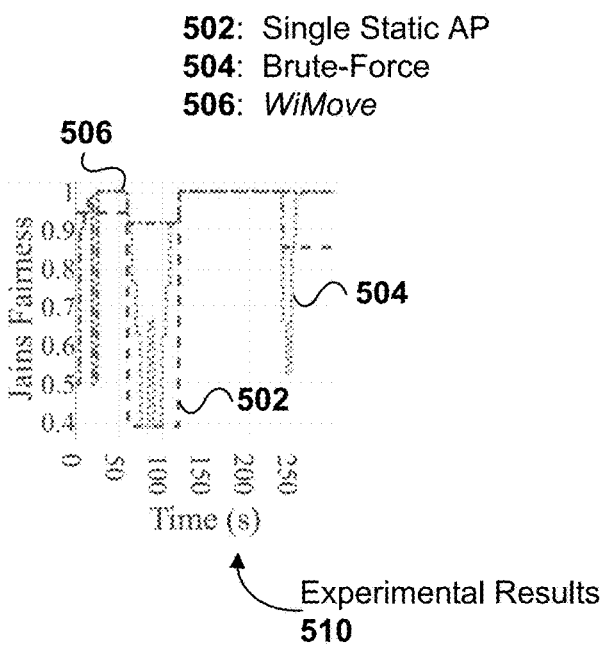

This disclosure allows the model to adapt for the first 25 time steps, and present the performance metrics for the last 100 time steps. The metrics are smoothen using a moving average filter with 20 time-steps, and presented in FIG. 4 with the standard deviation of accuracy. FIG. 4 shows performance, accuracy 402, precision 404, and recall 406, of the online algorithm in a dynamic environment. The large variation in the performance over time steps can be attributed to the single data sample. With more data sample the variation could be reduced along with the performance improvement. The average accuracy, precision and recall over the last 100 time steps is 71.1%, 77.5% and 67.7% respectively.

Performance Evaluation

A. Evaluation Methodology

By way of example, consider a 9 m×6 m×3 m room with the platform mounted at the expected optimal location on the ceiling. There are a number of STAs in the room that would like to be served by 802.11ad at a specific time instant. The connectivity of STAs may be changed dynamically (e.g., existing STAs dropping off or an additional STA joining in). Here, this disclosure considers three different approaches to provide 60 GHz services to the considered STAs: 1) static AP, 2) brute-force, and 3) WiMove. For SP AP based approach, the goal is to identify the location on the platform that maximizes the number of LOS STAs.

The metrics to be studied are the number of LoS STAs, throughput performance of 60 GHz network and Jain's fairness index as the AP moves w.r.t. all STAs at each time instant. The overall evaluation time is set as 5 minutes. The platform moving speed is 4 cm/s.

Simulation configurations. Here, this disclosure evaluates the performance of the aforementioned 3 approaches through ns-3 simulations. WiMove approach adapts the AP location every time instant when the number of STAs changes if another location is predicted to have more LoS STAs. STAs join or leave the network based on the Poisson distribution with an expected rate of 1 per minute. Here, this disclosure considers the number of STAs to be 10. The distribution of STAs follows an obstacle dependent distribution.

Experimental configurations. To evaluate the performance of WiMove, brute-force, and single static AP, this disclosure mounted a 1 m long linear actuator on the optimal location of the ceiling in a typical lab environment utilizing cable zips. This unit is controlled by a central controller. The experimental platform is shown in FIG. 2. This disclosure uses 3 laptops as STAs. Similarly, STAs join or leave the network following Poisson distribution. When an STA joins the network, it chooses a specific one of 10 candidate locations as its location. To collect training data for ML, the LOS and distance matrices of 10 possible locations are hard coded, where this disclosure also considers a distance estimation error model. Limiting the possible candidate locations can improve prediction accuracy for the ML algorithm. For WiMove, the controller controls the location of the AP in the dynamic scenario based on the ML feedback.

B. Simulation Evaluation

Initially, 10 STAs are active. Based on the Poisson distribution of STA events, the STA number changes at each minute as {−2, +1/−1, +1}, where +1 means a new STA joins the network and −1 means a current STA drops off FIGS. 5A-5F show the number of LOS STAs, throughput, and Jain's fairness index, respectively, for the aforementioned three approaches at various time instants. FIGS. 5A-5F show both simulation 508 and experimental 510 results. For the initial 60 s, the average performance of the single static AP 502, brute-force 504 and WiMove 506 are very similar. From 120 s to 240 s, the throughput performance and Jain's fairness index of WiMove is 2.15× and 1.33× compared with single static AP case. This time period clearly reveals the drawback of static AP, which has very limited performance when AP does not have good channel connection with STAs. Overall, WiMove is 1.34× and 1.03× compared with brute-force and single static AP, and Jain's fairness index is 1.14× and 1.07× compared with single static AP and brute-force. During this set of simulations, WiMove never moved in the wrong direction. Since neighboring LOS locations are highly correlated (appears as a group), the AP moves toward the correct location as long as ML predict the single correct location connectivity in one of the grouped locations. For example, three locations have the maximum number of LOS connections and the prediction accuracy is 60%. The probability that the AP will not move towards such LOS location group is 6%. Thus, prediction granularity is another key parameter for WiMove.

C. Experimental Evaluation

For the environment setup for experimental evaluation, initially there are 2 STAs in the network and the STA numbers change at each minute as {+1, −2, +1/−1, +1}.

FIGS. 5A-5F illustrate the number of LOS STAs, throughput performance and Jain's fairness index for the aforementioned three approaches at various time instants. For WiMove and brute-force with an initial location at the edge of the platform, there is one STA in LOS condition. For the single static AP case, the 2 STAs are in NLOS condition. Initially, WiMove tries to explore the entire platform to collect network information (same as brute-force). In the first 60 s, WiMove and brute-force take 25 s to reach the location that has LOS w.r.t. to both STAs. Clearly, at the location with maximum LOS STAs, the network has high fairness and throughput. It is clear that the network performance might drop during the movement phase which might cause a lot of network performance deviation. The performance gain can be considerable when WiMove reaches the optimal location. For example, during the first 60 s for WiMove, the number of LOS STA is increased by 50%, the throughput is increased by 10%, and Jain's fairness index has also increased by almost 50%. For the period between 180 s to 240 s where only 1 STA is active, single static AP is in NLOS with that specific STA which leads to no throughput for the 60 GHz network. With mobility advantage, severe cases such as this can possibly be avoided. From this set of experiments, the throughput performance of WiMove is 2.19× and 1.29× compared with brute-force and single static AP, and Jain's fairness index is 1.15× and 1.08× compared with brute-force and single static AP. Overall, this disclosure can observe that WiMove dynamically adapts to network conditions and achieves the best performance among brute-force and single static AP. Overall, this disclosure can observe that WiMove dynamically adapts to network conditions and achieves the best performance among brute-force and single static AP.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

The invention claimed is:

1. A method of improving a line of sight condition between a wireless device and a mobile access point comprising:
   receiving a request to connect to a mobile access point from a wireless device;
   receiving location data from the wireless device corresponding to a location of the wireless device;
   determining a line of sight condition between the mobile access point and the wireless device;
   until an improved line of sight condition is determined, repeating a cycle of:
      moving the mobile access point to a location different from any prior location of the mobile access point; and
      determining a line of sight condition between the moved mobile access point and the wireless device;
      wherein the improved line of sight condition is determined when the line of sight condition between a subsequently moved mobile access point and the wireless device is an improved line of sight condition over the prior location of the subsequently moved mobile access point and the wireless device;
   creating, through machine learning, a map of one or more obstacles within a space based at least in part on one or more determined line of sight conditions; and
   using the map to identify one or more locations of the moved mobile access point possessing the improved line of sight condition.

2. The method of claim 1, wherein the mobile access point is disposed on a ceiling within a space.

3. The method of claim 1, wherein moving the mobile access point comprises moving the mobile access point with an actuator.

4. The method of claim 1 further comprising supporting the mobile access point via a track.

5. A wireless network system for the method of improving the line of sight condition of claim 1 comprising:
   the mobile access point;
   the wireless device;
   an actuator configured to move the mobile access point; and
   a controller comprising a processing platform and memory to store instruction that, when executed by the processing platform, are configured to cause the controller to output one or more control signals to the actuator to move the mobile access point.

6. The wireless network system of claim 5, wherein the controller is further configured to:
   receive the request to connect to the mobile access point from the wireless device;
   receive the location data from the wireless device corresponding to the location of the wireless device;
   determine the line of sight conditions between the mobile access point and the wireless device; and
   determine when the line of sight condition is the improved line of sight condition;

wherein the one or more control signals activate the actuator to move the mobile access point to an optimal location.

7. A wireless network system comprising:
an actuator; and
a controller configured to:
  receive a request to connect to a mobile access point from a wireless device;
  receiving location data from the wireless device corresponding to a location of the wireless device; and
  until a line of sight condition is determined to be one of a clear line of sight condition or an improved line of sight condition, to repeat a cycle of:
    receiving connectivity data between the wireless device and the mobile access point;
    determining the line of sight condition based at least in part on the connectivity data; and
    outputting a control signal to the actuator;
  wherein:
    if in a first cycle:
      the determined line of sight condition is the clear line of sight condition between the wireless device and the mobile access point, wherein the clear line of sight condition is when the line of sight between the wireless device and the mobile access point contains no obstacles, then the control signal controls the actuator to maintain the location of the mobile access point; or
      if the line of sight contains one or more obstacles, then the control signal controls the actuator to move the location of the mobile access point and repeat the cycle;
    if in a second or subsequent cycle:
      the determined line of sight condition is the clear line of sight condition, then the control signal controls the actuator to maintain the location of a moved mobile access point; or
      if the line of sight condition between the wireless device and the moved mobile access point is an improved line of sight condition over the line of sight condition between the wireless device and a prior location of the moved mobile access point, then the control signal controls the actuator to maintain the location of the moved mobile access point; or
      if the determined line of sight condition is not the improved line of sight condition, then the control signal controls the actuator to move the location of the mobile access point to a location different from any prior location of the mobile access point and repeat the cycle; and
  the controller is further configured to:
    create, through machine learning, a map of one or more obstacles within a space based at least in part on one or more determined line of sight conditions made by the controller; and
    use the map to identify one or more locations of the moved mobile access point possessing the improved line of sight condition.

8. The wireless network system of claim 7, wherein the controller is further configured to:
  predict an optimal location for the mobile access point by determining a location with the clear line of sight conditions based at least in part on the map and the location data from the wireless device;
  wherein the control signal controls the actuator to move the mobile access point to the optimal location.

9. A controller in wired or wireless communication with an actuator, the controller configured to move a mobile access point by outputting one or more control signals to the actuator, the controller comprising:
a processor; and
memory storing instructions that, when executed by the processor, are configured to cause the controller to:
  receive requests from a plurality of wireless devices to connect to the mobile access point;
  receive location data from each of the plurality of wireless devices; and
  until a set of line of sight conditions is determined to be an optimal set of line of sight conditions, repeat a cycle of:
    receiving connectivity data between the mobile access point and each of the plurality of wireless devices
    determining the set of line of sight conditions based at least in part on the connectivity data between the mobile access point and each of the plurality of wireless devices; and
    outputting a control signal to the actuator
  wherein:
    if the determined set of line of sight conditions is the optimal set of line of sight conditions, wherein each line of sight between each wireless device and the mobile access point contains no obstacles, then the instructions, when executed by the processor, are further configured to cause the controller to output the control signal to control the actuator to maintain the location of the mobile access point; or
    if one or more lines of sight between each wireless device and the mobile access point contains one or more obstacles, then the instructions, when executed by the processor, are further configured to cause the controller to output the control signal to control the actuator to move the location of the mobile access point to a location different from any prior location of the mobile access point and repeat the cycle; and
  the instructions, when executed by the processor, are further configured to cause the controller to:
    create, through machine learning, a map of one or more obstacles within a space based at least in part on the determined set of line of sight conditions made by the controller; and
    use the map to identify one or more locations of the moved mobile access point possessing the optimal set of line of sight conditions.

10. A wireless network system comprising:
an actuator; and
a controller configured to:
  receive requests to connect to a mobile access point from wireless devices;
  receive location data from each of the wireless devices corresponding to the locations of each of the wireless devices; and
  until a set of line of sight conditions is determined to be an optimal set of line of sight conditions, to repeat a cycle of:
    receiving connectivity data between each of the wireless devices and the mobile access point;
    determining the set of line of sight conditions based at least in part on the connectivity data; and
    outputting a control signal to the actuator;
  wherein:
    if the determined set of line of sight conditions is the optimal set of line of sight conditions, wherein each line of sight between each wireless device and the mobile access point contains no obstacles, then the control signal controls the actuator to maintain the location of the mobile access point; or if one or more lines of sight between each wireless device and the mobile access point contains one or more obstacles, then the control signal controls the actuator to move the location of the mobile access point to a location different from any prior location of the mobile access point and repeat the cycle; and the controller is further configured to:
- create, through machine learning, a map of one or more obstacles within a space based at least in part on the determined set of line of sight conditions made by the controller; and
- use the map to identify one or more locations of a moved mobile access point possessing the optimal set of line of sight conditions.

11. The wireless network system of claim 10, wherein the mobile access point is disposed on a ceiling within a space.

12. The wireless network system of claim 10, wherein the actuator is a linear actuator.

13. The wireless network system of claim 10 further comprising a track configured to support the mobile access point.

14. The wireless network system of claim 10, wherein the controller is further configured to:
- predict an optimal location for the mobile access point by determining a location with the optimal set of line of sight conditions based at least in part on the map and the location data from the wireless devices; and
- wherein the control signal controls the actuator to move the mobile access point to the optimal location.

* * * * *

UNITED STATES PATENT AND TRADEMARK OFFICE
CERTIFICATE OF CORRECTION

PATENT NO. : 12,500,327 B2
APPLICATION NO. : 17/923761
DATED : December 16, 2025
INVENTOR(S) : Yubing Jian et al.

Page 1 of 1

It is certified that error appears in the above-identified patent and that said Letters Patent is hereby corrected as shown below:

In the Specification

Column 1, Line 18, before the Heading "BACKGROUND," please insert the following Heading and paragraph:
-- STATEMENT REGARDING FEDERALLY SPONSORED RESEARCH OR DEVELOPMENT
This invention was made with government support under 1813242 awarded by the National Science Foundation. The government has certain rights in the invention. --

Signed and Sealed this
Twenty-seventh Day of January, 2026

John A. Squires
*Director of the United States Patent and Trademark Office*